US009860787B2

(12) United States Patent
Lv et al.

(10) Patent No.: US 9,860,787 B2
(45) Date of Patent: *Jan. 2, 2018

(54) COMMUNICATION METHOD AND SYSTEM, ACCESS NETWORK DEVICE, AND APPLICATION SERVER

(71) Applicant: Huawei Technologies Co., Ltd., Shenzhen (CN)

(72) Inventors: Xinyan Lv, Shenzhen (CN); Feng Xing, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/373,118

(22) Filed: Dec. 8, 2016

(65) Prior Publication Data

US 2017/0094557 A1 Mar. 30, 2017

Related U.S. Application Data

(63) Continuation of application No. 13/848,453, filed on Mar. 21, 2013, now Pat. No. 9,532,238, which is a (Continued)

(51) Int. Cl.

*H04W 28/06* (2009.01)
*H04W 4/18* (2009.01)
(Continued)

(52) U.S. Cl.

CPC ............. *H04W 28/06* (2013.01); *H04W 4/18* (2013.01); *H04W 8/26* (2013.01); *H04W 40/02* (2013.01);
(Continued)

(58) Field of Classification Search

CPC ....... H04W 4/00; H04W 72/00; H04W 28/00; H04W 8/00; H04W 40/00
See application file for complete search history.

(56) References Cited

U.S. PATENT DOCUMENTS 7,809,813 B2 * 10/2010 Ma ...................... G06F 17/3089 709/223
9,532,238 B2 * 12/2016 Lv ......................... H04W 24/02
(Continued)

FOREIGN PATENT DOCUMENTS

CN 101599895 A 12/2009
CN 101155053 B 3/2011
(Continued)

OTHER PUBLICATIONS

Machine Translation and Abstract of Chinese Publication No. CN101155053, Mar. 30, 2011, 10 pages.
(Continued)

*Primary Examiner* — Andrew Lai
*Assistant Examiner* — Sumitra Ganguly
(74) *Attorney, Agent, or Firm* — Conley Rose, P.C.

(57) ABSTRACT

A communication method and system, an access network device, and an application server, where the communication method includes receiving, by an access network device, a service packet, and sending, by the access network device, the received service packet to an application server according to a policy, where the application server is arranged at an access network side, and is independent from the access network device or in the access network device, and the application server supports operation of at least one service. An application server that supports operation of third-party applications is introduced at an access network side such that a user equipment (UE) can directly perform service interaction with the access network side, which significantly improves the response time of a user request, decreases service delay, and improves the quality of service (QoS) of a service, thereby improving user experience.

20 Claims, 9 Drawing Sheets

Related U.S. Application Data continuation of application No. PCT/CN2012/073666, filed on Apr. 9, 2012.

(51) Int. Cl.

| | |
|---|---|
| ***H04W 72/04*** | (2009.01) |
| ***H04W 8/26*** | (2009.01) |
| ***H04W 40/02*** | (2009.01) |
| *H04W 4/00* | (2009.01) |

(52) U.S. Cl.

CPC ........ *H04W 72/0493* (2013.01); *H04W 4/005* (2013.01)

(56) References Cited

U.S. PATENT DOCUMENTS

| | | | |
|---|---|---|---|
| 2002/0094813 A1 | 7/2002 | Koshimizu et al. | |
| 2005/0132049 A1 | 6/2005 | Inoue et al. | |
| 2009/0268668 A1 | 10/2009 | Tinnakomsrisuphap et al. | |
| 2009/0291696 A1 | 11/2009 | Cortes et al. | |
| 2010/0034089 A1* | 2/2010 | Kovvali .............. | H04L 67/2842 370/235 |
| 2010/0177680 A1 | 7/2010 | Fischer et al. | |
| 2011/0116460 A1 | 5/2011 | Kovvali et al. | |
| 2012/0064908 A1 | 3/2012 | Fox et al. | |
| 2012/0076120 A1 | 3/2012 | Kovvali et al. | |
| 2012/0102222 A1* | 4/2012 | Mao .................. | H04L 29/08072 709/238 |
| 2013/0029719 A1 | 1/2013 | Choi et al. | |

FOREIGN PATENT DOCUMENTS

| | | | |
|---|---|---|---|
| CN | 102143035 | A | 8/2011 |
| EP | 2293512 | A1 | 3/2011 |
| EP | 2566115 | A1 | 3/2013 |
| JP | 2000276425 | A | 10/2000 |
| JP | 2002217812 | A | 8/2002 |
| JP | 2003508958 | A | 3/2003 |
| JP | 2011519537 | A | 7/2011 |
| JP | 2011525312 | A | 9/2011 |
| JP | 2012508475 | A | 4/2012 |
| WO | 0116788 | A2 | 3/2001 |
| WO | 2011129635 | A2 | 10/2011 |

OTHER PUBLICATIONS

Huawei Tech., "Discussion Paper for Study on Smart Mobile Content Delivery in 3GPP Networks," S1-111098, 3GPP TSG-SA Meeting #54, May 9-13, 2011, 4 pages.

"3rd Generation Partnership Project; Technical Specification Group Radio Access Network; Evolved Universal Terrestrial Radio Access Network (E-UTRAN); S1 Application Protocol (S1AP) (Release 10)," 3GPP TS 36.413, V10.5.0, Technical Specification, Mar. 2012, 255 pages.

Foreign Communication From A Counterpart Application, Japanese Application No. 2014-532223, Japanese Office Action dated Aug 4, 2017, 3 pages.

Foreign Communication From A Counterpart Application, Japanese Application No. 2014-532223, English Translation of Japanese Office Action dated Aug. 4, 2015, 3 pages.

Foreign Communication From A Counterpart Application, Japanese Application No. 2016-004999, Japanese Office Action dated Sep. 20, 2016, 4 pages.

Foreign Communication From A Counterpart Application, Japanese Application No. 2016-004999, English Translation of Japanese Office Action dated Sep. 20, 2016, 4 pages.

Foreign Communication From A Counterpart Application, Chinese Application No. 201280000731.5, Chinese Office Action dated Jul. 27, 2015, 5 pages.

Foreign Communication From A Counterpart Application, Chinese Application No. 201280000731.5 Chinese Search Report dated Jul. 17, 2015, 2 pages.

Foreign Communication From A Counterpart Application, European Application No. 12874308.5, Extended European Search Report dated Jul. 7, 2014, 10 pages.

Foreign Communication From A Counterpart Application, PCT Application No. PCT/CN2012/073666, English Translation of International Search Report dated Jan. 9, 2013, 2 pages.

Foreign Communication From A Counterpart Application, PCT Application No. PCT/CN2012/073666, English Translation of Written Opinion dated Jan. 9, 2013, 11 pages.

* cited by examiner

COMMUNICATION METHOD AND SYSTEM, ACCESS NETWORK DEVICE, AND APPLICATION SERVER

CROSS-REFERENCE TO RELATED APPLICATIONS

This application is a continuation of U.S. patent application Ser. No. 13/848,453, filed on Mar. 21, 2013, now U.S. Pat. No. 9,532,238, which is a continuation of International Patent Application No. PCT/CN2012/073666, filed on Apr. 9, 2012. The afore-mentioned patent applications and patent are hereby incorporated by reference in their entireties.

TECHNICAL FIELD

The embodiments of the present disclosure relate to the field of mobile communications technologies, and in particular, to a communication method and system, an access network device, and an application server.

BACKGROUND

In the field of the mobile communications technologies, a user equipment (UE) needs to establish a connection with an external network (for example, the Internet) through a wireless network, and enjoys services of third-party application services through the external network or a remote server.

As shown in FIG. 1, the wireless network mainly includes an access network 110 and a core network (CN) 120, where management functions of radio resources are mainly implemented in the access network 110 in a centralized manner, and functions related to services and applications are mainly implemented in the core network 120 in a centralized manner. Therefore, the access network 110 is a bridge connecting a UE 130 and the core network 120. The service interaction of the UE 130 with the external network is based on the connection among the UE 130, the access network 110, and the core network 120, and is finally implemented through a gateway 121 at a core network side. A remote server 140 is arranged behind the gateway 121 of the core network 120 and is far away from the UE 130, resulting in problems such as extended service delay and low quality of service (QoS), thereby influencing user experience.

SUMMARY

Embodiments of the present disclosure provide a communication method and system, an access network device, and an application server in order to solve the problems of extended service delay and low QoS of a service, thereby improving user experience.

In one aspect, an embodiment of the present disclosure provides a communication method, including receiving, by an access network device, a service packet, sending, by the access network device, the received service packet to an application server according to a policy, where the application server is arranged at an access network side, and is independent from the access network device or in the access network device, and the application server supports operation of at least one service.

In another aspect, an embodiment of the present disclosure provides a communication method, including receiving, by an application server, a service packet sent by an access network device, where the application server is arranged at an access network side, and is independent from the access network device or in the access network device, and the application server supports operation of at least one service. The application server processes the service packet.

In another aspect, an embodiment of the present disclosure provides an access network device, including a first interface unit configured to communicate with a user equipment, a second interface unit configured to communicate with a core network, and a third interface unit configured to communicate with an application server, where the application server is arranged at an access network side, and is independent from the access network device or in the access network device, and the application server supports operation of at least one service, and a processor, connected to each of the first interface unit, the second interface unit, and the third interface unit, and configured to receive a service packet through the first interface unit or the second interface unit, and send, through the third interface unit, the received service packet to the application server according to a policy.

In another aspect, an embodiment of the present disclosure provides an application server, supporting operation of at least one service, and arranged at an access network side, and being independent from an access network device or in the access network device. The application server includes an interface unit configured to communicate with the access network device, a storage unit configured to store service data of a service supported by the application server, and a processing unit connected to each of the interface unit and the storage unit, and configured to receive, through the interface unit, a service packet sent by the access network device, and process the service packet.

In another aspect, an embodiment of the present disclosure provides a communication system, and the foregoing access network device and the foregoing application server are arranged at an access network side of the communication system.

In another aspect, an embodiment of the present disclosure provides a computer readable storage medium, including a program, used to perform the above method.

In another aspect, an embodiment of the present disclosure provides a computer readable storage medium, including a program, used to perform the above method.

It can be seen that, according to the embodiments of the present disclosure, an application server that supports operation of third-party applications is introduced at an access network side such that a UE can directly perform service interaction with the access network side, which significantly improves the response time of a user request, decreases service delay, and improves the QoS of a service, thereby improving user experience.

BRIEF DESCRIPTION OF THE DRAWINGS

To illustrate the solutions in the embodiments of the present disclosure more clearly, the following briefly describes the accompanying drawings required for describing the embodiments. The accompanying drawings in the following description merely show some embodiments of the present disclosure, and persons of ordinary skill in the art can derive other drawings from these accompanying drawings without creative efforts.

DETAILED DESCRIPTION OF THE EMBODIMENTS

To make the objectives, solutions, and advantages of the embodiments of the present disclosure more comprehensible, the following clearly and completely describes the solutions according to the embodiments of the present disclosure with reference to the accompanying drawings in the embodiments of the present disclosure. The embodiments in the following description are merely a part rather than all of the embodiments of the present disclosure. All other embodiments obtained by persons skilled in the art based on the embodiments of the present disclosure without creative efforts shall fall within the protection scope of the present disclosure.

In an embodiment of the present disclosure, the problems existing in the process of service interaction of existing third-party applications are fully taken into consideration, and a logical network element supporting operation of third-party applications is introduced at an access network side. In this way, a UE can perform service interaction with the access network side directly, which significantly improves the response time of a user request, decreases service delay, improves the QoS of a service, thereby improving user experience. Detailed descriptions are made in the following with reference to the accompanying drawings.

Figure 1:
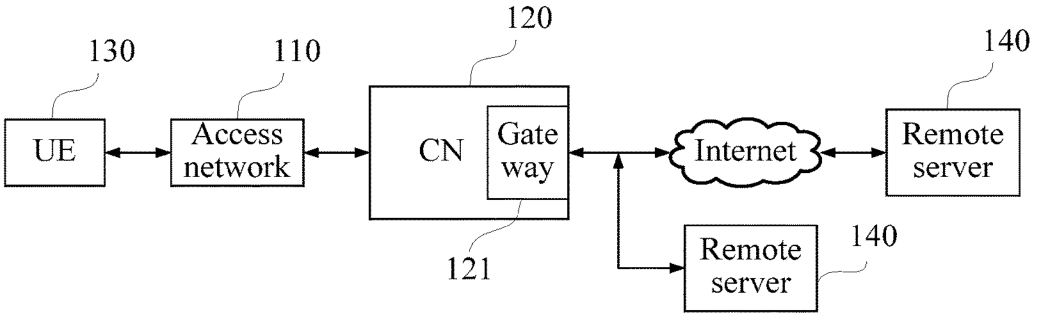
FIG. 1 is a schematic structural diagram of a communication system.
Figure 2:
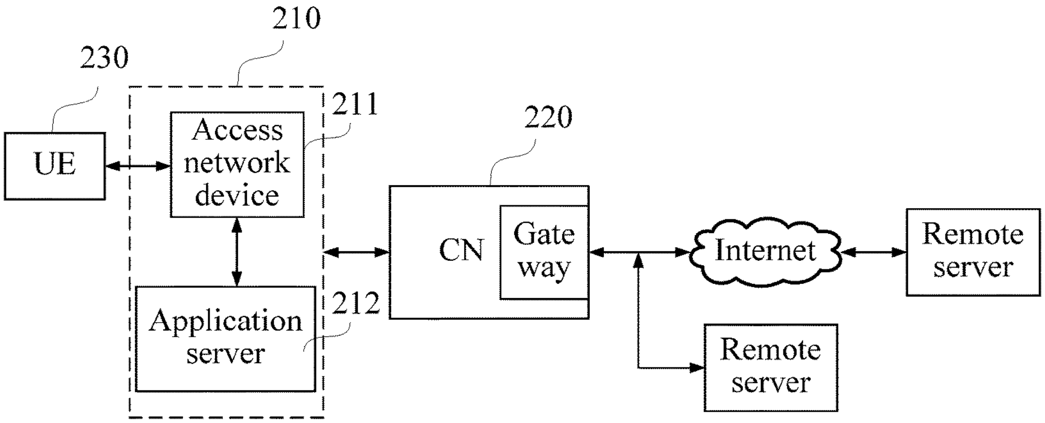
FIG. 2 is a schematic structural diagram of a communication system provided in an embodiment of the present disclosure.

FIG. 2 is a schematic structural diagram of a communication system provided in an embodiment of the present disclosure. Referring to FIG. 2, it can be seen that a logical network element introduced at an access network 210 side is an application server 212 in the embodiment of the present disclosure, and the application server 212 supports operation of at least one service. Physically, the application server 212 may be an independent device outside an access network device 211, or integrated in the access network device 211, which is not limited by this embodiment in any manner.

In addition to original functions, the access network device 211 needs to implement an additional packet bypass function in order to bypass a service packet from a UE 230 or a core network 220 to the application server 212 for processing. The original functions of the access network device 211 include management of radio resources, forwarding of air interface data, and maintenance of a UE status, which are well known to persons skilled in the art and not described in detail herein again.

It should be noted that the access network device 211 is a device that enables an UE to access the wireless network, including, but not limited to, a Node B, an evolved Node B (eNB), a home Node B (HNB), home eNode B (HeNB), a radio network controller (RNC), a base station controller (BSC), and a base transceiver station (BTS).

In addition, the third-party applications according to this embodiment include, but not limited to, cache acceleration related to the Web pages, video transcoding, machine-to-machine (M2M) handshake signaling termination, and content storage and distribution, which may be provided by a third party and are not restricted by this embodiment in any manner. In addition, the application server 212 may be an open application server which offers an open platform for a third-party application provider, and supports expansion of various third-party applications, thereby further improving user experience.

More detailed descriptions are made on the access network device 211 and the application server 212 in the following with reference to accompanying drawings.

Figure 3:
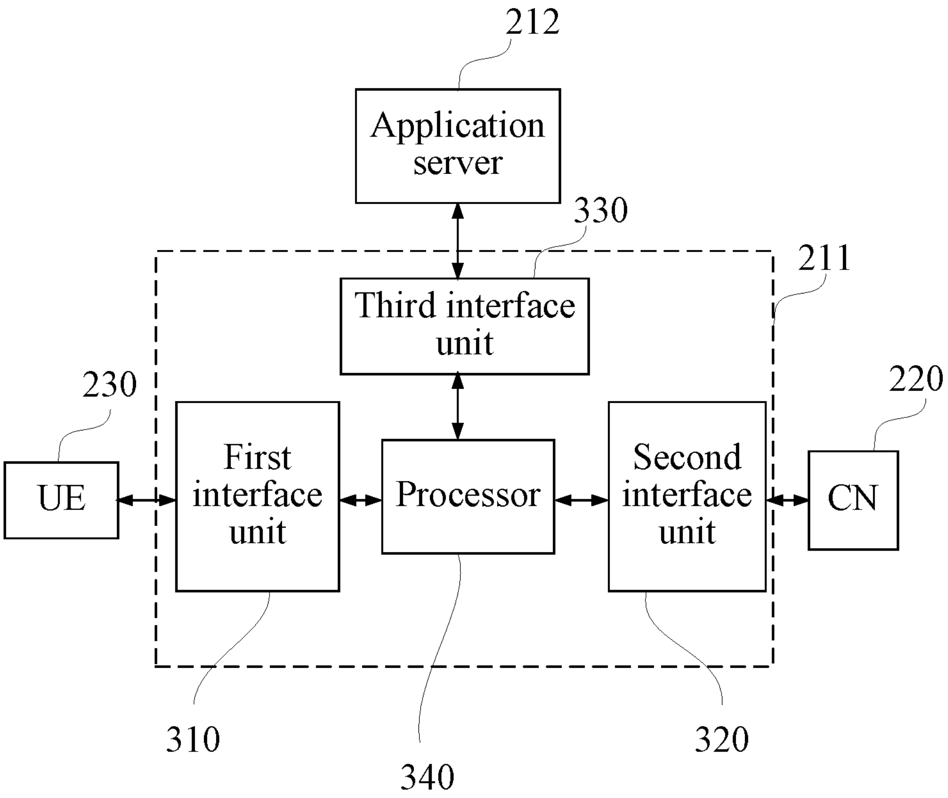
FIG. 3 is a schematic structural diagram of an access network device provided in an embodiment of the present disclosure.

FIG. 3 is a schematic structural diagram of an access network device provided in an embodiment of the present disclosure. As shown in FIG. 3, the access network device 211 includes a first interface unit 310, a second interface unit 320, a third interface unit 330, and a processor 340 connected to each of the first interface unit 310, the second interface unit 320, and the third interface unit 330. The first interface unit 310 is configured to communicate with a UE 230. The second interface unit 320 is configured to communicate with a core network 220, and the third interface unit 330 is configured to communicate with the application server 212. The processor 340 is configured receive a service packet through the first interface unit 310 or the second interface unit 320, and send, through the third interface unit 330, the received service packet to the application server 212 according to a policy. As described above, the application server 212 supports operation of at least one service, and the application server 212 is arranged at an access network side, independent from the access network device 211 or in the access network device 211.

The policy for sending a service packet to the application server 212 by the access network device 211 includes sending all service packets received by the access network device 211 to the application server 212, or identifying, with identity information, whether a service packet can be sent to the application server 212, sending, to the application server 212, a service packet that can be sent to the application server 212, and sending, to the core network 220, a service packet that cannot be sent to the application server 212. The identity information may be some identity information carried in existing service packets, including, but not limited to, subscriber profile identity (SPID) information, QoS class identifier (QCI) information, stateful packet inspection (SPI) information, or deep packet inspection (DPI). The correspondence between the identity information and whether a service packet can be sent to the application server 212 may be defined by an operator, which is not limited by this embodiment in any manner.

A situation that a part of service packets are sent according to the SPID to the application server 212 for processing is taken as an example, where the SPID is a subscriber identity defined by an operator and currently have a value in the range of 1 to 256, and specific meanings may be defined by the operator (currently, merely some values are defined for a camping priority and an inter-frequency/inter-Radio Access Technology (RAT) handover priority). The operator may predefine some SPIDs to present which bearers of a subscriber or which kinds of service packets can be sent to the application server 212 for processing such that, after receiving a service packet, the access network device 211 can determine, according to the SPID of the subscriber, whether to send the received service packet to the application server 212.

A situation that a part of service packets are sent according to the QCI to the application server 212 for processing is taken as an example, where the QCI includes nine classes, an operator may predefine which class or which classes of services need to be sent to the application server 212 for processing such that, after receiving a service packet, the access network device 211 can determine, according to the QCI of the service packet, whether to send the received service packet to the application server 212.

A situation that a part of service packets are sent according to the SPI or the DPI to the application server 212 for processing is taken as an example, where an operator may predefine some rules for forwarding service packets to the application server 212, for example, a packet is forwarded according to a 5-tuple of the packet (a source Internet Protocol (IP), a destination IP, a source port, a destination port, and a protocol type) such that, after receiving a service packet, the access network device 211 can determine, according to forwarding rules, whether to send the received service packet to the application server 212.

Figure 4:
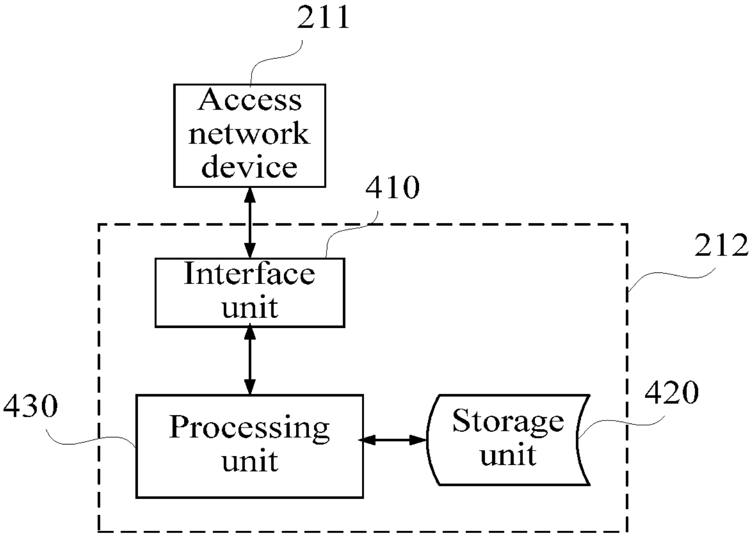
FIG. 4 is a schematic structural diagram of an application server provided in an embodiment of the present disclosure.

FIG. 4 is a schematic structural diagram of an application server provided in an embodiment of the present disclosure. As shown in FIG. 4, the application server 212, as described above, supports operation of at least one service, and is arranged at the access network side and may be independent from the access network device or in the access network device. The application server 212 includes an interface unit 410, a storage unit 420, and a processing unit 430 connected to each of the interface unit 410 and the storage unit 420. The interface unit 410 is configured to communicate with the access network device 211. The storage unit 420 is configured to store service date of a service supported by the application server 212, and the processing unit 430 is configured to receive, through the interface unit 410, a service packet sent by the access network device 211, and process the service packet.

It should be noted that the processing unit 430 may be a processor, and the storage unit 420 may be a memory. If the application server 212 is integrated in the access network device 211, functions of the processing unit 430 of the application server 212 can be implemented in the processor 340 of the access network device 211 in FIG. 3, that is, the application server 212 shares the processor with the access network device 211.

The procedure of processing a corresponding service packet by the processing unit 430 varies with the service packet received by the processing unit 430. The procedure includes, but not limited to, the following cases.

Figure 5:
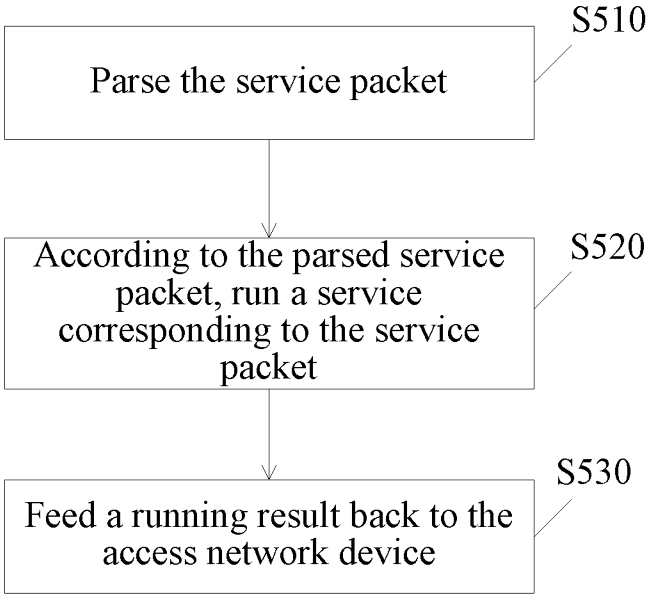
FIG. 5 is a schematic flow chart of an application server processing a service packet provided in an embodiment of the present disclosure.

The policy is set according to a service type that can be currently supported by the application server 212, and only a service packet of a service supported by the application server 212 is sent to the application server 212 when a policy of sending a service packet to the application server 212 by the access network device 211 is preset. In this way, the application server 212 does not need to determine whether it supports the received service packet. The procedure for the processing unit 430 to process the service packet is shown in FIG. 5, which includes the following steps.

Step S510: Parse the service packet, which is a process to peel off information of other protocol layers in order to obtain data of an application layer.

Step S520: According to the parsed service packet, run a service corresponding to the service packet.

Step S530: Feed a running result back to the access network device.

Figure 6:
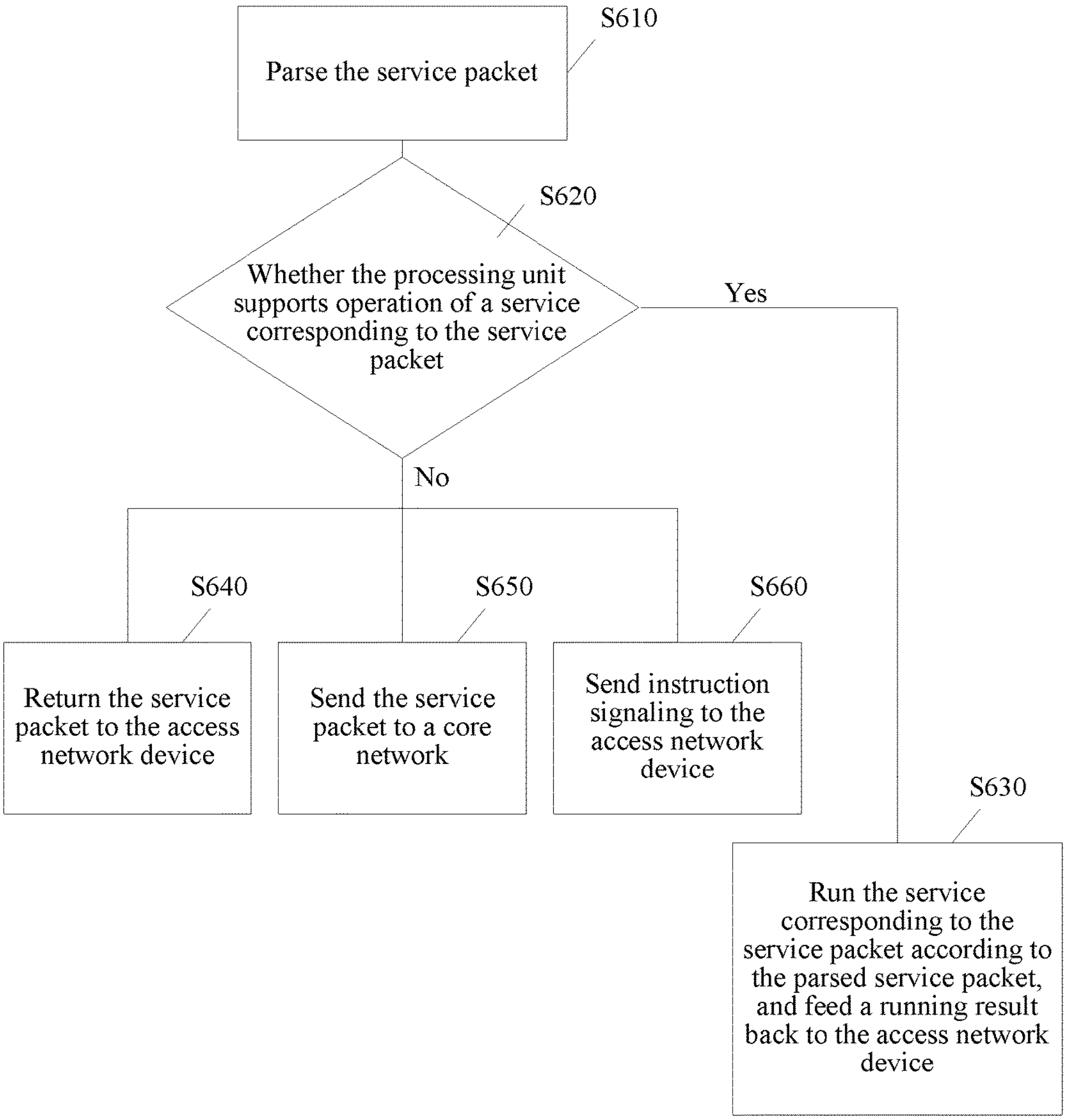
FIG. 6 is another schematic flow chart of an application server processing a service packet provided in an embodiment of the present disclosure.

As shown in FIG. 6, when a policy of sending a service packet to the application server 212 by the access network device 211 is preset, and if the policy is not set according to a service type currently supported by the application server, the process for the processing unit 430 to process the service packet includes the following steps.

Step S610: Parse the service packet, which is similar to step S510 and is not described in detail herein again.

Step S620: According to the parsed service packet, determine whether the processing unit supports operation of a service corresponding to the service packet, perform step S630 if the processing unit supports operation of the service corresponding to the service packet, and perform step S640, step S650 or step S660 if the processing unit does not support operation of the service corresponding to the service packet.

If the result of parsing indicates that the processing unit supports operation of the service corresponding to the service packet, the service corresponding to the service packet is run according to the parsed service packet, and a running result is fed back to the access network device (step S630), if the result of parsing indicates that the processing unit does not support operation of the service corresponding to the service packet, the service packet is returned to the access network device (step S640) such that the access network device sends the service packet out through a conventional channel, or the service packet is sent to a core network (step S650), and at this time, a direct channel from the application server to the core network is required, or instruction signaling is sent to the access network device (step S660), where the instruction signaling is used to instruct the access network device to send the service packet to a core network. Because the access network device has received the service packet, the access network device only needs to cache the service packet and sends, according to the instruction information, the service packet out through a conventional channel. When the application server cannot provide a service, foregoing step S640, step S650, or step S660 is provided in order to ensure that the service is provided to a UE in a conventional manner and ensure that the service is not interrupted.

In addition, the update data is stored in the storage unit if the parsed service packet includes update data of the service supported by the processing unit.

Considering that the service packet is transmitted between the access network device 211 and the application server 212, a user plane channel needs to be established between the access network device 211 and the application server 212. One manner is as follows. The user plane channel is preset, and at this time, a user plane protocol only needs to be defined such that the service packet is transmitted through the preset user plane channel according to the user plane protocol. Another manner is as follows. A protocol of the third interface unit 330 of the access network device 211 and a protocol of the interface unit 410, interacting with the interface unit 330, of the application server 212 are configured such that according to the configured protocols, a user plane channel is established between the access network device 211 and the application server 212 if necessary in order to transmit the service packet through the user plane channel.

Each of the protocols of the third interface unit 330 and the interface unit 410 is an application and wireless network interface protocol such that the user plane channel is established between the access network device 211 and the application server 212 according to the application and wireless network interface protocol.

Figure 7:
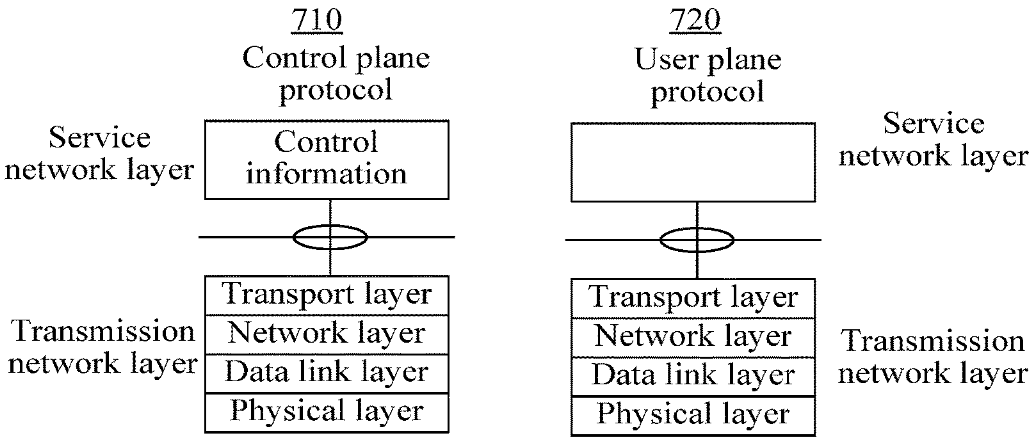
FIG. 7 is a schematic structural diagram of an application and a wireless network interface protocol provided in an embodiment of the present disclosure.

FIG. 7 is a schematic structural diagram of the application and wireless network interface protocol. As shown in FIG. 7, the application and wireless network interface protocol includes a control plane protocol 710 and a user plane protocol 720. The user plane protocol 720 is used for information transmission on a user plane channel. The control plane protocol 710 is used for establishment of the user plane channel, and the establishment of the user plane channel includes establishing, according to the control plane protocol, a control plane link between the access network device and the application server, and establishing, according to control information borne by the control plane link, the user plane channel between the access network device and the application server.

The control plane protocol 710 includes a service network layer protocol and a transmission network layer protocol, where the service network layer protocol includes control information, and the transmission network layer protocol includes a physical layer protocol, a data link layer protocol, a network layer protocol, and a transport layer protocol. The user plane protocol 720 includes a service network layer protocol and a transmission network layer protocol. The service network layer protocol is similar to the existing service network layer protocol used for service packet transmission between a UE and a remote server, and an access network does not process this part of protocol, and merely performs transparent transmission, which are well known to persons skilled in the art and not described in detail herein again in this embodiment. The transmission network layer protocol is used to implement transmission of a service packet, and the transmission network layer protocol also includes a physical layer protocol, a data link layer protocol, a network layer protocol, and a transport layer protocol.

In the transmission network layer protocol of the control plane protocol 710, the network layer protocol may be an IP, and the transport layer protocol may be a stream control transmission protocol (SCTP), a transmission control protocol (TCP), or a user datagram protocol (UDP). In the transmission network layer protocol of the user plane protocol 720, the network layer protocol may be an IP, the transport layer protocol may include a UDP and a general packet radio service (GPRS) tunneling protocol-user plane (GTP-U), where the GTP-U may be replaced by a UDP tunneling protocol, an IP tunneling protocol, or a data link layer tunneling protocol. This case is merely an example herein, and is not intended to limit the present disclosure.

The foregoing control information includes, but not limited to, reset information, an open application programming interface (API) interface setting request message, and a base station configuration update message, which is described with an LTE access technology as an example. Other access technologies, such as a universal mobile telecommunications system (UMTS), are similar to it, and are not described in detail herein again.

Preferably, the control information includes a status information subscription request message, used to instruct an access network device to send status information of a wireless network to an application server. In this may, a third-party application can flexibly adjust the processing of a service packet according to the status information. For example, a high-definition video resource may be adjusted to a common video resource and sent to a UE if the status information indicates that an air interface is congested. For another example, more radio resources may be distributed to ensure video quality when services related to most of service packets are point-to-point (P2P) communications and only a small part of services are video services.

Preferably, the control information includes a policy modification request message, used to indicate a policy of sending a service packet to an application server by an access network device. In this way, an operator can flexibly adjust, according to a requirement of a third-party application, a policy of sending a service packet to the application server by the access network device.

It can be seen that, the processor 340 of the access network device 211 is further configured to establish, through the third interface unit 330, a user plane channel between the access network device 211 and the application server 212, and the processing unit 430 of the application server 212 is further configured to establish, through the interface unit 410, a user plane channel between the access network device 211 and the application server 212.

It should be noted that a service packet may come from a UE or come from a core network side, so a user plane channel may be established in each of an uplink direction and a downlink direction. Of course, an independent user plane channel may also be established. At this time, to differentiate whether the service packet is data from a UE side or data from a core network side, a direction identity field needs to be added in the service packet to identify a source direction of the service packet.

In addition, considering that the number of services supported by the application server is usually more than one, when a user channel in one direction (the uplink direction or the downlink direction) is considered, if all services share one user plane channel, an identity needs to be added in a service packet to identify a forwarding destination, that is, identify which service the service packet is provided to for running, and the application server needs to identify and distribute service packets if no field is added.

Figure 8:
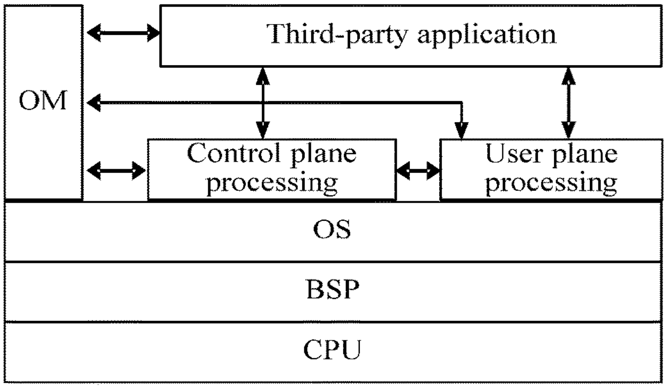
FIG. 8 is a software architecture diagram of an application server provided in an embodiment of the present disclosure.

The hardware structure of the application server is described above, and a software structure of the application server is described with reference to the accompanying drawings in the following. The processing unit of the server manages, through the following software structure, other units of the application server, to implement functions of the whole application server. FIG. 8 shows a software architecture of an application server provided in an embodiment of the present disclosure. As shown in FIG. 8, the processing unit 430 is a central processing unit (CPU), on which an operating system (OS) is run through a board support package (BSP). In this way, a control plane processing program, a user plane processing program, a third-party application program, an operation manager (OM) program are run at a platform provided by the OS.

The control plane processing program is used to process a control plane message between the application server and the access network device, and the following three basic kinds of control processes, a basic management process, a service bearer management process, and an open information obtaining process, exist. The basic management process is used to establish and maintain a control plane link between the application server and the access network device. The service bearer management process is used to establish and maintain a user plane channel between the application server and the access network device, and the open information obtaining process is used for the application server to subscribe to status information of a wireless network (including status information of an air interface at an access network device side or status information of the access network device), and used for reporting the status information from the access network device.

The user plane processing program provides processing of the user plane channel between the application server and the access network device, and is used for service packet interaction between the access network device and the application server.

The third-party application program terminates or forwards application layer data of a user or provides a specific service according to a specific application.

The OM program is used to coordinate and manage user plane processing, control plane processing, and a third-party application, and has at least a log/test/version management function.

As can be seen from the foregoing description, in addition to original functions, the access network device needs to implement the following additional functions.

1. Sending a service packet to the application server for processing. If an independent user plane channel to each third-party application is established, a packet is merely forwarded to a corresponding user plane channel (if a user plane channel is established in each of the uplink and the downlink, each channel indicates a direction. Otherwise, a direction identity field needs to be used, to identify whether the data is data from a UE or data from a core network). If third-party applications share one user plane channel, an identity (used to identify a sending destination) needs to be added, and then the packet is sent, and if no identity is added, packets need to be identified and distributed at a receiving end (if a user plane channel is established in each of the uplink and the downlink, each channel indicates a direction. Otherwise, a direction identity field needs to be used).

2. Forwarding the packet after receiving the packet from the application server. If each third-party application establishes an independent user plane channel, the packet needs to be sent to a UE or a core network according to a direction (if a channel is established in each of the uplink and the downlink, each channel indicates a direction. Otherwise, a direction identity field needs to be used). If third-party applications share one user plane channel, a packet needs to be forwarded according to a policy. Optional polices include, but not limited to, forwarding the packet according to a DPI, identifying and forwarding the packet according to an identity (used to identify a sending destination—a specific bearer) (if a channel is established in each of the UE direction and the core network direction, each channel indicates a direction. Otherwise, a direction identity field needs to be used).

3. Establishment of a user plane channel.

Functions of the application server include the following.

1. Parsing a service packet sent by the access network device.

2. Establishing a user plane channel.

3. Executing a third-party application.

4. Receiving the packet from the access network device for processing, and forwarding the service packet to a specific third-party application. If each third-party application establishes an independent user plane channel, a packet on a corresponding channel is only forwarded to a corresponding third-party application (if a channel is established in each of the uplink and the downlink, each channel indicates a direction. Otherwise, a direction identity field needs to be used), and a packet needs to be forwarded according to a policy if third-party applications share one user plane channel. Optional polices include, but not limited to, forwarding the packet according to a DPI, and identifying and forwarding the packet according to a forwarding identity (if a channel is established in each of the uplink and the downlink, each channel indicates a direction. Otherwise, a direction identity field needs to be used).

5. Sending a packet to the access network device for processing, that is, forwarding a user plane packet of a third-party application to a user plane channel. If each third-party application establishes an independent user plane channel, a packet only needs to be forwarded to a corresponding channel (if a channel is established in each of the uplink and the downlink, each channel indicates a direction. Otherwise, a direction identity field needs to be used), if third-party applications share one user plane channel, an identity (used to identify a forwarding destination) needs to be added to the packet, and then the packet is forwarded (if no identity is added, the packet needs to be identified and distributed at a receiving end, each channel indicates a direction if a channel is established in each of the uplink and the downlink. Otherwise, a direction identity field needs to be used).

Figure 9:
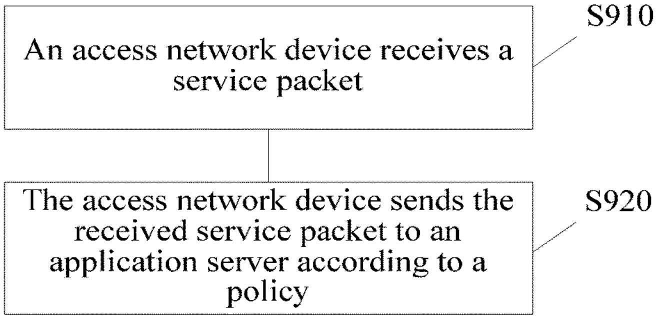
FIG. 9 is a flow chart of a communication method provided in an embodiment of the present disclosure.

Corresponding to the foregoing access network device, an embodiment of the present disclosure further provides a communication method. As shown in FIG. 9, the method includes the following steps.

Step S910: An access network device receives a service packet.

Step S920: The access network device sends the received service packet to an application server according to a policy.

As described in the foregoing description, the application server is arranged at an access network side, and is independent from the access network device or in the access network device, and the application server supports operation of at least one service.

It can be seen that, a service packet from a UE side can be forwarded to the application server through the access network device, and processed by the application server. In this way, a response to the service packet from the UE side can be implemented at the access network side, which significantly improves the response time of a user request, decreases service delay, and improves the QoS of a service, thereby improving user experience.

Similar to the foregoing embodiment, in step S910, the service packet received by the access network device may come from a UE side or come from a core network side.

Similar to the foregoing embodiment, in step S920, the policy of sending a service packet to the application server by the access network device includes, but not limited to, sending all service packets received by the access network device to the application server, or identifying, with identity information, whether a service packet can be sent to the application server, sending, to the application server, a service packet that can be sent to the application server, and sending, to a core network, a service packet that cannot be sent to the application server. The setting of the identity information is similar to the foregoing embodiment, which is not detailed herein again.

Figure 10:
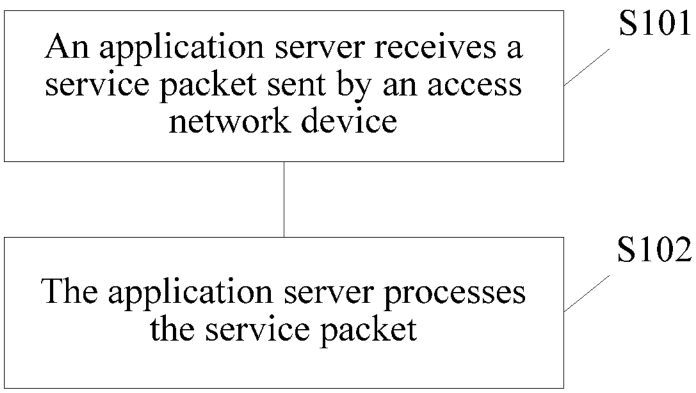
FIG. 10 is a flow chart of another communication method provided in an embodiment of the present disclosure.

Corresponding to the foregoing application server, an embodiment of the present disclosure further provides another communication method. As shown in FIG. 10, the method includes the following steps.

Step S101: An application server receives a service packet sent by an access network device, where the application server is arranged at an access network side, and is independent from the access network device or in the access network device, and the application server supports operation of at least one service.

Step S102: The application server processes the service packet.

It can be seen that, the application server that supports operation of a service is arranged at the access network side, and receives and processes a service packet from the access network device. In this way, a response to a service packet of a UE side can be implemented at the access network side, which significantly improves the response time of a user request, decreases service delay, and improves the QoS of a service, thereby improving user experience.

The procedure of processing the corresponding service packet in step S102 varies with a service packet received by the application server. The procedure includes, but not limited to, the procedure shown in FIG. 5 and FIG. 6.

In addition, update data is stored to a storage unit if a parsed service packet includes the update data of a service supported by a processing unit.

Before the access network device sends a service packet to the application server and the application server receives the service packet from the access network device, a user plane channel needs to be established between the access network device and the application server. The manner of establishing the user plane channel is similar to what described above, which is not detailed herein again.

Figure 11:
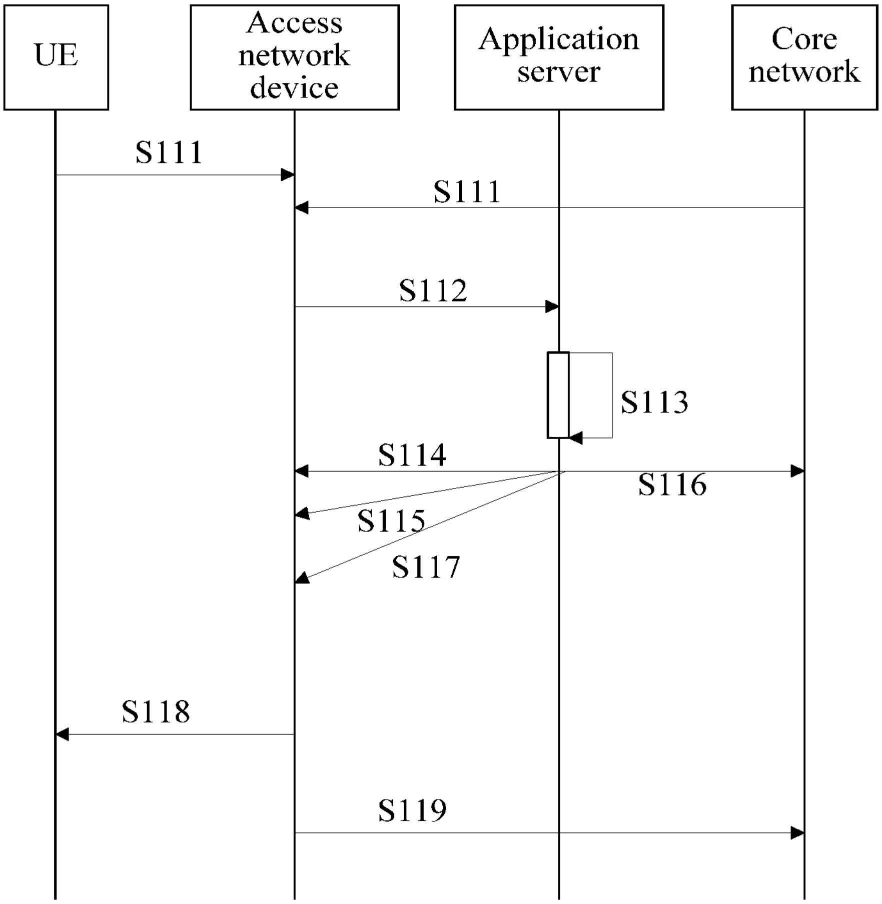
FIG. 11 is a schematic diagram of another communication method provided in an embodiment of the present disclosure.

Corresponding to the foregoing communication system, an embodiment of the present disclosure further provides a communication method. As shown in FIG. 11, the method includes the following steps.

Step S111: An access network device receives a service packet sent by a UE or a core network.

Step S112: The access network device sends the received service packet to an application server according to a policy.

Before step S112, a user plane channel needs to be established between the access network device and the application server.

As described above, the user plane channel may be preset such that after the access network device and the application server are powered on, the user plane channel can bear user plane information. Alternatively, according to an interface protocol between the access network device and the application server, the user plane channel is established after the access network device and the application server are powered on or the access network device receives a service packet that needs to be forwarded to the application server.

In addition, the number of user plane channels established may be one or more. For example, if the transmission of uplink and downlink service data is taken into consideration, a user plane channel may be established in each of the uplink and the downlink, or only one user plane channel is established, and a direction identity field is added in the service packet. For another example, considering data of third-party applications running on the application server, a user plane channel may be established for each third-party application, or only one user plane channel shared by all third-party applications may be established, and at this time, the received service packet needs to be identified and distributed at a receiving end, or an identity field identifying a destination needs to be added in the service packet.

Step S113: The application server processes the service packet.

The service packet usually includes a service request of the UE if the service packet comes from a UE, and if the application server has a service resource requested by the UE, the application server sends the service resource to the access network device (S114). If the application server does not have the service resource requested by the UE, the application server returns the service packet to the access network device such that the access network device sends the service packet out through a conventional channel (S115), or the application server sends the service packet to a core network directly, and at this time, a direct channel from the application server to the core network is required (S116), or the application server sends instruction signaling to the access network device (S117), where the instruction signaling is used to instruct the access network device to send the service packet to a core network. Because the access network device has received the service packet in step S111, the access network device only needs to cache the service packet and sends, according to the instruction information, the service packet out through a conventional channel such that a service is provided to the UE in a conventional manner when the application server cannot provide the service.

Step S118: The access network device sends the service resource to the UE when receiving the service resource requested by the UE.

Step S119: The access network device continues to send the service packet to a core network when receiving the returned service packet or the instruction signaling.

It should be noted that if the application server supports a service requested by the UE but does not have the service resource requested by the UE, because a service request may continue to be sent through the core network to an external network, then the requested service resource may be obtained through the external network. The application server stores the service resource in step S113 to update the service resource in the application server when the requested service resource is sent through the core network to the access network device, and the access network device forwards the service resource to the application server. Of course, the service resource for the updating may also be sent by the external network to the application server through the core network and the access network device regularly or in real time.

It can be seen that, when receiving the service request of the UE, the access network device sends the service request to the application server. The application server can provide a service for the UE directly if the application server has the service resource requested by the UE, which significantly shortens a path of service interaction and reduces the number of network elements involved in the service interaction. Therefore, service delay is decreased, the QoS of a service is improved, and user experience is improved. Even though the application server does not support the service requested by the UE or does not have the service resource, the application server may also continue to send, through the core network, the service request to a remote server in order to avoid the influence on use of the service of a user. From the perspective of the whole system, each access network device usually allows access of multiple UEs, and each UE usually has multiple service requirements. Therefore, there is certainly a service that can be supported by the application server, thereby decreasing service delay and improving the QoS of a service on the whole. Especially for a same service request of multiple UEs, backhaul resources can also be saved with the foregoing method. For example, when the application server supports Web related Cache acceleration and many users have access or downloading needs for hot videos, micro-blogs and the like, the application server provides this kind of services directly at this time, which significantly saves backhaul resources, solves the problem that a part of users cannot perform access due to insufficiency resources, and decreases downloading and access delay, thereby significantly improving user experience.

For another example, in step S111, the access network device receives an M2M handshake request of the UE, and a destination UE requested by the UE also accesses the access network device. In a conventional process, the service request needs to pass through the core network and is fed by the access network device back to the destination UE. Using the method provided in this embodiment, as long as the application server supports an M2M handshake service, the service request does not need to pass through the core network, thereby decreasing service delay and saving backhaul resources.

Features and advantages of the communication method, the access network device, the application server, and the communication system provided in the embodiments are described with an LTE communication system as an example. Other communication systems (such as a UMTS and a global system for mobile communications (GSM)) are similar to it, and details are not described again in the following embodiments.

Figure 12:
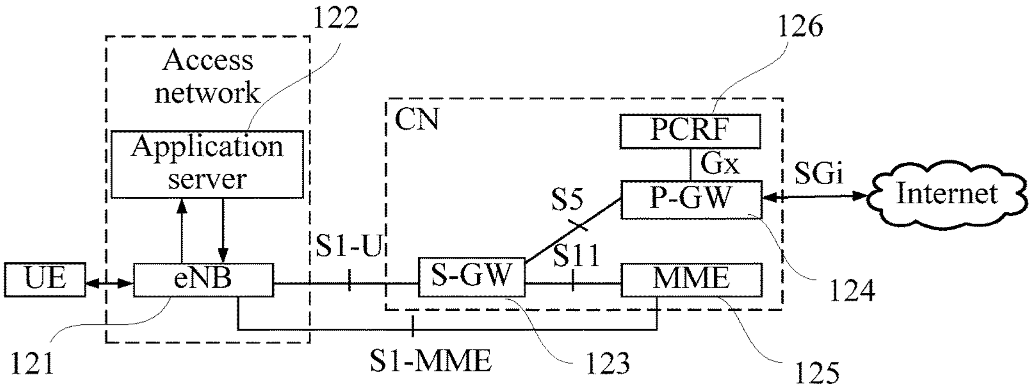
FIG. 12 is a schematic structural diagram of a Long Term Evolution (LTE) communication system provided in an embodiment of the present disclosure.

FIG. 12 is a schematic structural diagram of an LTE communication system provided in an embodiment of the present disclosure. As shown FIG. 12, an eNB 121 and an application server 122 are arranged at an access network side, where the application server 122 is configured to run a third-party application service, and the eNB 121 needs to bypass a received service packet to the application server 122 for processing. The bypassed service packet may be a service packet from an air interface (UU) (that is, a service packet sent by a UE), or a service packet from an S1-U interface and borne in the GTP-U. A serving gateway (S-GW) 123, a packet data network (PDN) gateway (P-GW) 124, and a mobility management entity (MME) 125 are arranged at a core network side. The P-GW 124 is configured to detect a service data stream between different networks, perform policy execution, and perform stream-based charging, and is a user plane anchor point between a third generation partnership project (3GPP) access network and a non-3GPP access network, and an interface connecting a core network-packet switched domain to an external PDN. Meanwhile, the P-GW 124 may serve as a policy and charging enforcement function (PCEF) entity and may be connected, through a Gx interface, to a policy and charging rules function (PCRF) entity 126. The S-GW 123 is configured to establish a user plane tunnel between the eNB 121 and the P-GW. Responsibilities of the MME 125 includes termination of non-access layer signaling (for example, mobility management and session management), gateway selection, and UE authentication.

Figure 13:
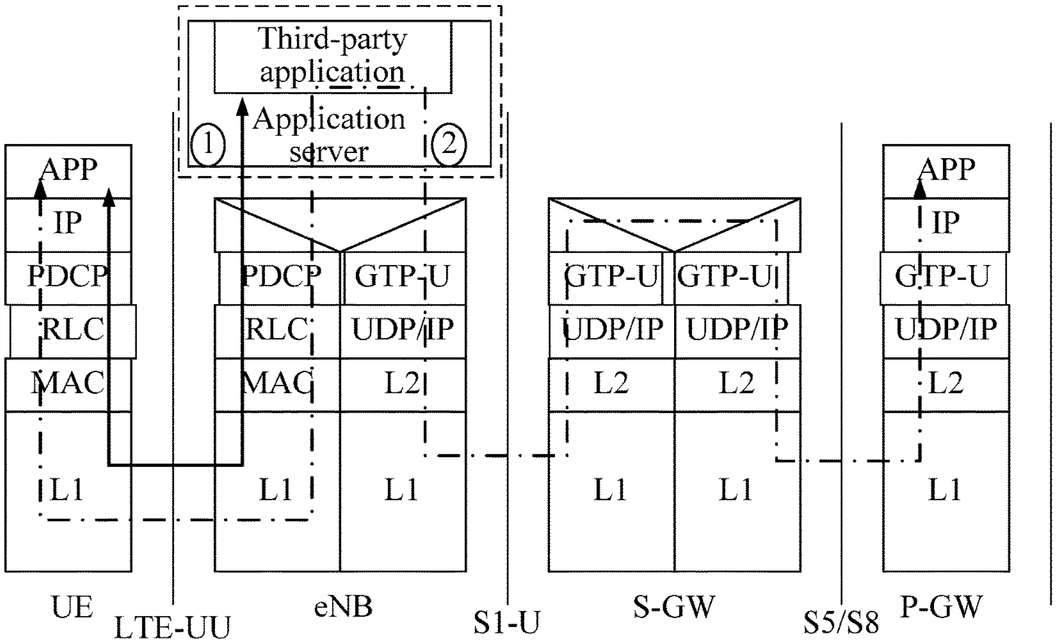
FIG. 13 is a schematic diagram of a user plane data stream in an LTE communication system provided in an embodiment of the present disclosure.

It should be noted that, as for an HNB/HeNB scenario, because the coverage of a site is too small, the application server may be deployed in an HNB/HeNB gateway (GW) to lower a cost. As for UMTS and GSM, the application server may be deployed in or near the RNC/BSC. The HNB/HeNB GW or the RNC/BSC needs to bypass a received service packet to the application server for processing, where the bypassed packets varies with different standards/interface modes. As for the UMTS, the bypassed packets are packets from an air interface direction and from an Iu-PS interface direction, and for the GSM, the bypassed packets are packets from an air interface direction and from an A/Iu-PS interface direction. FIG. 13 is a schematic diagram of a user plane data stream of the communication system shown in FIG. 12. The solid line ① represents a user plane data stream that can be terminated by the application server, that is, if the user plane data stream can be terminated, a third-party application can directly generate a downlink packet and use an established GTP-U. The dotted line ② represents a user plane data stream that cannot be terminated by the application server. In the embodiment of the present disclosure, the user plane data stream represented by the solid line ① may be selected preferably according to a third-party application supported by the application server. Compared with a conventional case that only the user plane data stream represented by the dotted line ② exists, service delay is decreased, and the QoS of a service is improved, thereby improving user experience.

Figure 14:
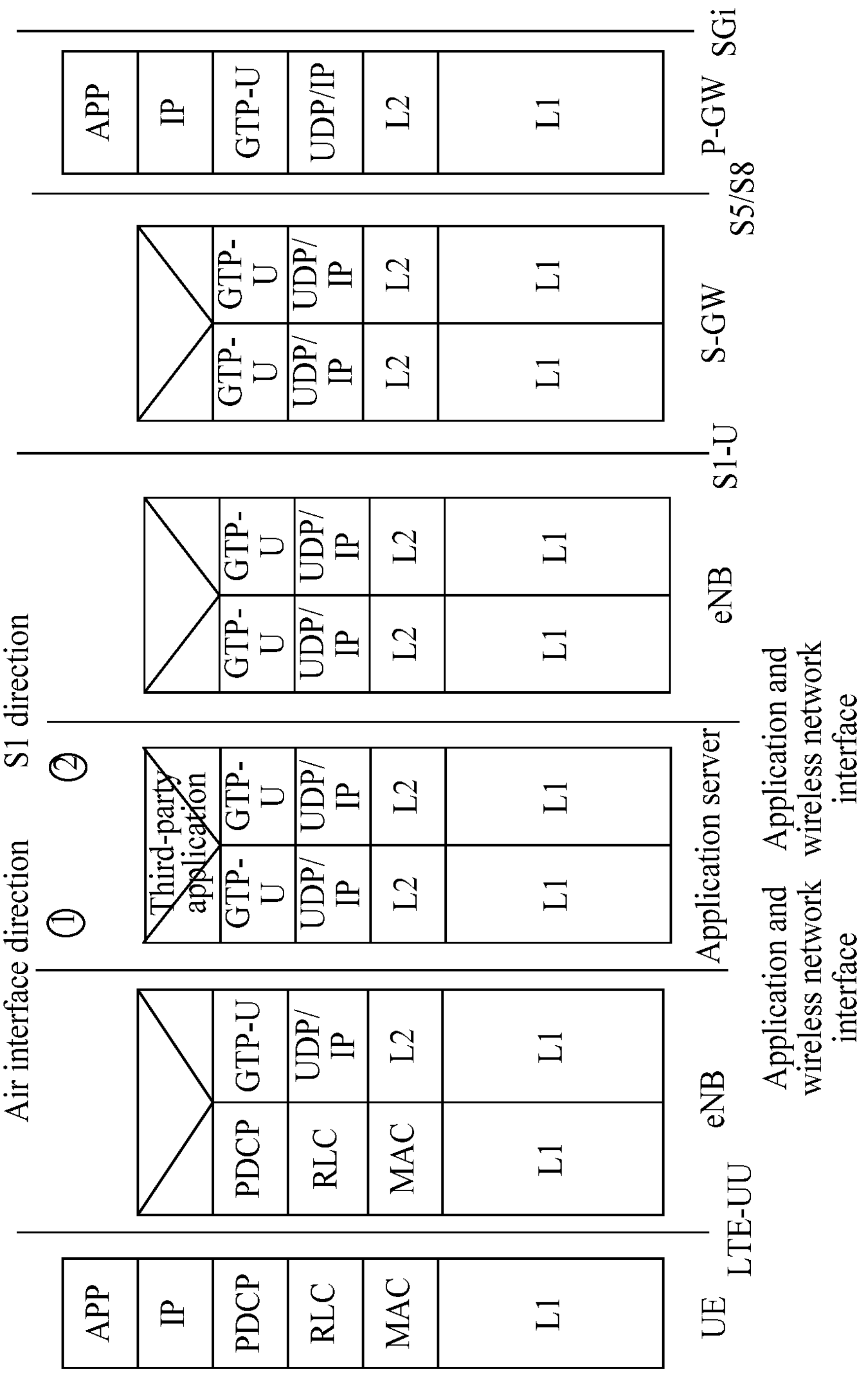
FIG. 14 is a schematic diagram of a user plane interface of an LTE communication system provided in an embodiment of the present disclosure.

Further referring to FIG. 14, to facilitate packet transmission between the eNB 121 and the application server 122, a user plane channel is established in each of an uplink direction and a downlink direction in this embodiment to bear a service packet in an air interface direction and a service packet in an S1 direction, respectively. For the clarity of description, eNBs are shown separately in FIG. 14, but in fact, the two eNBs in FIG. 14 is an entity physically. In addition, a channel in the air interface direction and a channel in the S1 direction may be the same or different, and a user plane channel is different from an S1 channel, and a service packet needs to be transferred by the eNB.

An application and wireless network interface protocol is similar to what described above, and a list of control information in the control plane protocols of the application and wireless network interface protocol is provided below (as shown in Table. 1 and Table. 2, the process in Table. 1 is a process in which a response is required, and the process in Table. 2 is a process in which a response is not required).

TABLE 1

| Elementary Procedure | Initiating Message | Successful Outcome Response message | Unsuccessful Outcome Response message | Comment |
|---|---|---|---|---|
| Reset | Reset | Reset Acknowledge | | Used for mutual notification between the |

TABLE 1-continued

| Elementary Procedure | Initiating Message | Successful Outcome Response message | Unsuccessful Outcome Response message | Comment |
|---|---|---|---|---|
| | | | | application server and the eNB when the application server or the eNB is reset |
| Open API Interface Setup | Open API Interface Setup Request | Open API Interface Setup Response | Open API Interface Setup Failure | Used for establishing a control plane link from the application server to the eNB |
| eNB Configuration Update | eNB Configuration Update | eNB Configuration Update Acknowledge | eNB Configuration Update Failure | Used for notification to the application server when the configuration of the eNB is changed |
| APP Server Configuration Update | APP Server Configuration Update | APP Server Configuration Update Acknowledge | APP Server Configuration Update Failure | Used for notification to the eNB when configuration of the application server is changed |
| Service Bearer Setup | Service Bearer Setup Request | Service Bearer Setup Response | | Used for establishing a user plane channel between the eNB and the application server |
| Service Bearer Modify | Service Bearer Modify Request | Service Bearer Modify Response | | Used for notification when the parameter of the user plan channel between the eNB and the application server is changed |
| Service Bearer Release | Service Bearer Release Request | Service Bearer Release Response | | Used for release of the user plane channel between the eNB and the application server |
| Status Information Subscribe | Status Information Subscribe Request | Status Information Subscribe Response | | The application server triggers eNB status information subscription |
| Policy Modify | Policy Modify Request | Policy Modify Response | | Used for the application server to trigger eNB policy modification. |

TABLE 2

| Elementary Procedure | Message | Comment ( |
|---|---|---|
| Error Indication | Error Indication | Bidirectional error indication |
| Service Bearer Release | Service Bearer Release indicate | The application server notifies the release of the user plane channel to the eNB |
| Status Information Subscribe Indicate | Status Information Subscribe Indicate | Used for the eNB to report status information to the application server |

It should be noted that the UMTS and the GSM may reuse the message type in the tables, but its name and meaning need to be modified. For example, eNB related words need to be modified into specific network element names (for example, the RNC in the UMTS), and other meaning remains the same, but specific cells are different.

The detailed process of establishing a user plane channel is described in the following according to the foregoing control information and with reference to FIG. 15.

Figure 15:
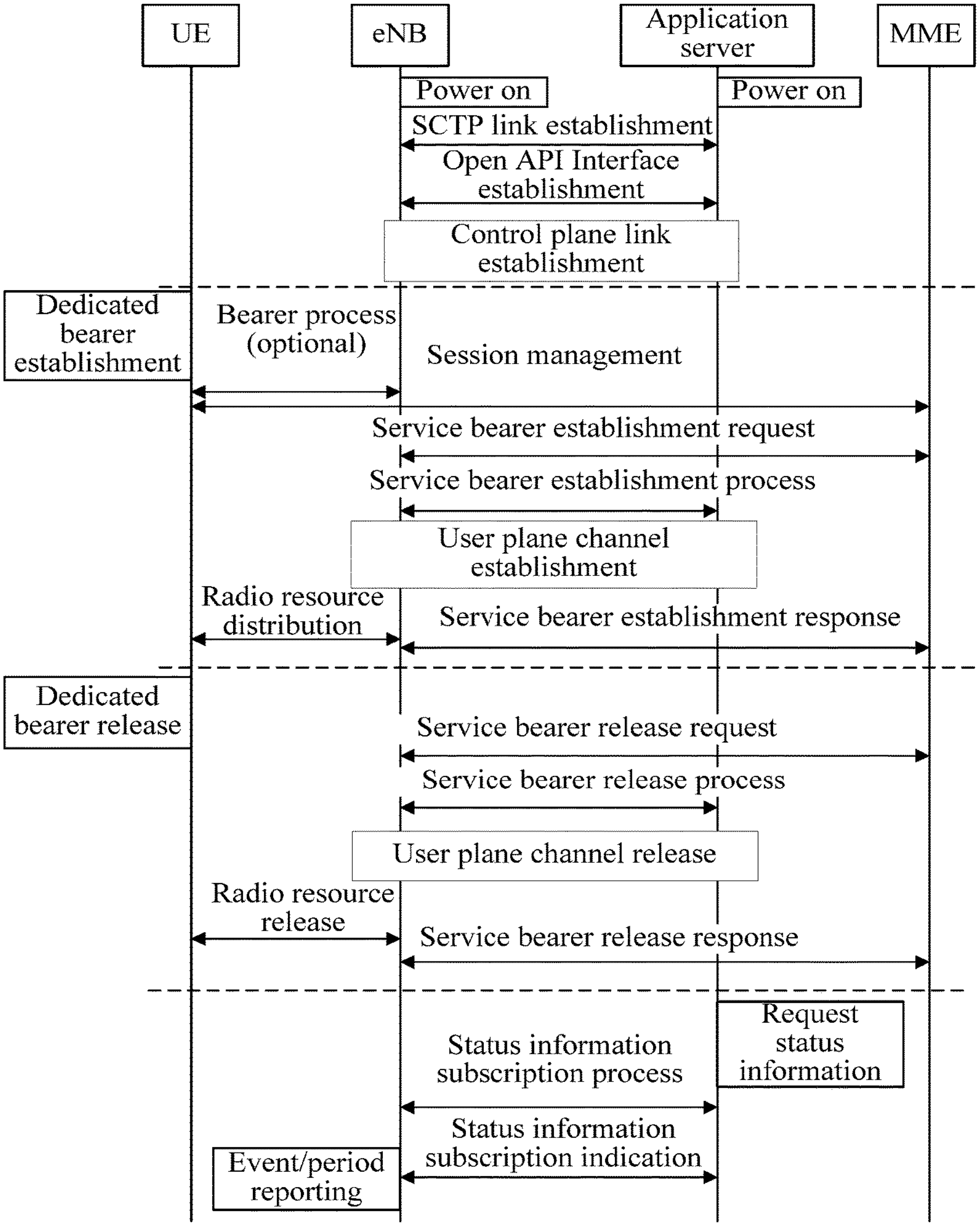
FIG. 15 is a schematic diagram of a control plane data stream in an LTE communication system provided in an embodiment of the present disclosure.

As shown in FIG. 15, a control plane link is established between an eNB and an application server after the eNB and the application server are powered on. Further, the eNB initiates a process of establishing an SCTP link, and after the SCTP link is successfully established, a process of establishing an Open API is initiated. After the open API is successfully established, the establishment of the control plane link is completed.

A user plane channel is established between the eNB and the application server. When a dedicated bearer with a UE is established, if the eNB receives a service bearer establishment request sent by an MME, the eNB triggers a process of establishing a service bearer to the application server in order to complete the process of establishing the user plane channel. Two user plane channels or one user plane channel may be established for the air interface direction and the S1 direction. It is required to identify the channel or the service packet is from an air interface direction or from an S1 direction if only one user plane channel is established. Regardless of whether the process succeeds or not, an S1 tunnel (namely, a tunnel between an eNB and a core network) is established. However, the eNB cannot forward the service packet to the application server if the user plane channel is not successfully established. In addition, regardless of whether the process of establishing a service bearer succeeds or not, a service bearer establishment response needs to be sent to the MME to notify whether the user plane channel is established or not. The service bearer, session management, and radio resource distribution are well known to persons skilled in the art, and not described in detail herein again.

If the eNB receives a bearer update request sent from the MME, the eNB determines whether the bearer information of the application server needs to be updated, and if yes, the eNB initiates bearer update. Otherwise, the eNB does not initiate the bearer update. The process is not shown in FIG. 15.

The eNB needs to instruct the application server to release the service bearer if the eNB triggers bearer release by itself or after receiving a message from the MME. Then, a service bearer release response is sent to the MME to notify the situation of service bearer release to the MME.

In addition, the application server may initiate a process of subscribing to the status information if the application server intends to subscribe to status information of the eNB, and the eNB needs to report, in a period manner or in an event manner, the status information subscribed if the subscription succeeds.

To sum up, in the embodiments of the present disclosure, an application server that supports operation of third-party applications is introduced at an access network side such that a UE can directly perform service interaction with the access network side, which significantly improves the response time of a user request, decreases service delay, improves the QoS of a service, thereby improving user experience. Feasible networking solutions for adding an application server at the access network side include, but not limited to, a network networking structure of a single site or a networking structure in a cloud network scenario. Detailed descriptions are provided in the following.

Networking solution of a single site: An application server independent from an access network device is added directly at the access network side. Alternatively, the application server serves as a component unit of the access network device, for example, the application server is directly embedded in a baseband unit (BBU) in a manner similar to a baseband board. At this time, an application server unit should comply with a board design standard, and is embedded in the BBU and provides a link channel through a backboard.

Networking solution based on a cloud network scenario: The application server serving as a standard unit of a cloud base station (cloud BB) is embedded in a cabinet of the cloud BB and provides a third-party application service.

Currently, in other approaches, to shorten a distance from a remote server and a UE to further decrease service delay, a solution of moving a gateway down is put forward, for example, the gateway is moved down to an S-GW or an access network side or the like. The solution can solve problems of long service time and low QoS of a service, but cannot achieve the balance among mobility, lawful interception, charging, bandwidth saving and other aspects. Especially, for the processing of mobility, once the UE moves and performs access from other access network devices, a third-party service behind the gateway cannot sense the change, so service continuity cannot be ensured.

In the embodiment of the present disclosure, in combination with a specific third-party application, the problems in the mobility, lawful interception, charging, bandwidth saving and other aspects can be solved. An example is given in the following.

Mobility Processing.

In the architecture provided in an embodiment of the present disclosure, an eNB and an application server can implement establishment and maintenance of a user channel when a UE moves, thereby ensuring service continuity in coordination with a third-party service. The situation is described with an example.

For example, for Web related services, local Caches of this type of services are deployed on the application server, remote Caches of this type of services and a service continuity control functional entity are deployed behind an SGi interface of a core network, and a service termination functional entity is deployed between the P-GW and the S-GW. Content of the local Caches on the application server may have or may not have corresponding copies on the remote Caches, but indexes of all the local Caches are stored in a remote service continuity control functional entity, that is, a remote Cache functional entity can obtain, through calculation, whether the local Caches are hit.

When receiving a Hypertext Transfer Protocol (HTTP) request, the application server forwards the HTTP signaling to a core network through a S1-U tunnel, regardless of whether the local Caches are hit. The remote service continuity control functional entity forwards the request to a remote server. After receiving the request, the remote server sends data to the UE. The service continuity control functional entity makes a decision when the data passes through the entity. If the Caches are not hit, the data is cached, and a Cache Index is generated. Regardless of whether the Caches are hit, the content continues to be forwarded to the UE, and at the same time, whether the content is hit by the Caches on the application server is indicated by private associated information defined by a TCP extension header. After the content reaches the service termination functional entity through the P-GW, the associated information is checked by the entity. If it indicates that the content is hit by the application server, the content is discarded. Otherwise, the content continues to be forwarded to the UE. If the content continues to be forwarded to the application server through the S-GW and the eNB, the content that is not hit previously by a local Cache is cached, and a Cache Index is generated, and if the content is hit by a cache, the original content is replaced (fault tolerance processing).

When forwarding the HTTP request, a local application server may add a private extension header in a GTP-U packet that bears an application packet to indicate a local application identity, and if the content is hit, the GTP-U packet needs to carry a Cache Index, when passing through the service termination functional entity, the Cache Index may change to be borne by a private TCP extension header, when passing through the service continuity control functional entity, the service continuity control functional entity records the application server corresponding to the request and information in the TCP extension header such as the Cache Index. When the UE moves from one eNB to another eNB, if the application server is changed, the remote service continuity control functional entity learns that the application server is changed and learns whether content in a new application server is cached in the local application server, because all request information of the UE pass through the application server and the local application identity and the Cache Index are carried by the extension header of the GTP-U, In this way, a service can be transmitted continuously. When the UE moves from a region where an application server is available to a region where an application server is unavailable or moves from a region where an application server is unavailable to a region where an application server is available, because the control information of the UE is not terminated locally, the function of the remote service continuity control can sense the change and learn whether to forward the content. As a result, service continuity can also be ensured.

There are two solutions for the charging and lawful interception processing.

1. An application server gateway is deployed in a core network, and implements coordination with a charging gateway and a lawful interception gateway. For charging, a call details record is generated by an application server and reported to the application server gateway, and the application server gateway summarizes and reports the call details record to the charging gateway. For lawful interception, after the lawful interception is started, a packet is copied by the application server and reported to the application server gateway, and the application server gateway summarizes and reports the packet to the lawful interception gateway.

2. For a specific service such as the service described in the mobility processing, because control information of an application layer is constantly sent to the application server, and all packets of the application server pass through the P-GW, the original standard solution of the 3GPP can be used for charging and lawful interception. The charging and the lawful interception are implemented by the P-GW, so little impact is caused on an existing network element.

Persons of ordinary skill in the art can understand that all or part of the steps of implementing the foregoing method can be implemented by a program instructing relevant hardware. The program may be stored in a computer readable medium. The readable medium may be a read-only memory (ROM)/random-access memory (RAM), a magnetic disk, an optical disk or the like.

For example, an embodiment of the present disclosure provides a computer program product, including a computer readable medium. The readable medium includes a group of program codes, used to perform any communication method described in the foregoing embodiments.

Persons skilled in the art should understand that the accompanying drawings show only exemplary embodiments of the present disclosure and the units and processes shown in the drawings are not necessarily mandatory in the present disclosure.

Persons skilled in the art should understand that the units in the apparatus provided in the embodiment may be distributed in the apparatus according to the description of the embodiment, or may be arranged in one or more apparatuses which are different from those described in the embodiments. The units in the foregoing embodiment may be combined into one module, or split into multiple subunits.

Finally, it should be noted that the above embodiments of the present disclosure are merely intended for describing the solutions of the present disclosure other than limiting the present disclosure. Although the present disclosure is described in detail with reference to the foregoing embodiments, persons of ordinary skill in the art should understand that they can still make modifications to the solution described in the foregoing embodiments or make equivalent substitutions to some features thereof, and such modifications or substitutions cannot make the essence of the corresponding solution depart from the idea and scope of the solution of the embodiments of the present disclosure.

What is claimed is:

1. A communication method, applied to an access network side, wherein the access network side comprises an application server and an access network device, wherein the application server is independent from the access network device or in the access network device, wherein the application server supports operation of at least one service, and wherein the method comprises:

receiving, by the access network device, a service packet, wherein the service packet comprises identity information, and wherein the identity information is used to identify whether the service packet can be sent to the application server;

determining, by the access network device according to the identity information, whether the service packet can be sent to the application server;

sending, by the access network device, the service packet to the application server when the service packet can be sent to the application server; or, sending, by the access network device, the service packet to a core network when the service packet cannot be sent to the application server, wherein the method further comprises:

receiving, by the access network device from the application server, a status information subscription request message, wherein the status information subscription request message is used for requesting status information of a wireless network of the access network side; and sending, by the access network device according to the status information subscription request message, the status information of the wireless network to the application server.

2. The method according to claim 1, further comprising:

receiving, by the access network device from the application server, a policy modification request message, wherein the policy modification request message is used for indicating a policy of sending a service packet to the application server; and sending, by the access network device according the policy indicated by the policy modification request message, a subsequent service packet to the application server.

3. The method according to claim 1, wherein the identity information comprises subscriber profile identity (SPID) information, quality of service class identifier (QCI) information, stateful packet inspection (SPI) information, or deep packet inspection (DPI) information.

4. The method according to claim 1, further comprising establishing a user plane channel between the access network device and the application server in order to send the service packet through the user plane channel.

5. The method according to claim 4, wherein the user plane channel is established according to an application and a wireless network interface protocol, wherein the application and the wireless network interface protocol comprises a control plane protocol and a user plane protocol, wherein the user plane protocol is used for information transmission on the user plane channel, wherein the control plane protocol is used for the establishment of the user plane channel, and wherein the establishment of the user plane channel comprises:

establishing, according to the control plane protocol, a control plane link between the access network device and the application server; and establishing, according to control information borne by the control plane link, the user plane channel between the access network device and the application server.

6. A communication method, applied to an access network side, wherein the access network side comprises an application server and an access network device, wherein the application server is independent from the access network device or in the access network device, wherein the application server supports operation of at least one service, and wherein the method comprises:

receiving, by the application server from the access network device, a service packet;

processing, by the application server, the service packet;

sending, by the application server to the access network device, a status information subscription request message, wherein the status information subscription request message is used for requesting status information of a wireless network of the access network side; and receiving, by the application server from the access network device, the status information of the wireless network.

7. The method according to claim 6, further comprising:

sending, by the application server to the access network device, a policy modification request message, wherein the policy modification request message is used for indicating a policy of sending a service packet to the application server; and receiving, by the application server from the access network device, a subsequent service packet sent according to the policy indicated by the policy modification request message.

8. The method according to claim 6, further comprising sending, by the access network device, the service packet to a core network when the service packet cannot be sent to the application server.

9. An access network device, located on an access network side, wherein the access network side comprises an application server and the access network device, wherein the application server is independent from the access network device or in the access network device, wherein the application server supports operation of at least one service, and wherein the access network device comprises:

a first interface configured to communicate with a terminal;

a second interface configured to communicate with a core network;

a third interface configured to communicate with the application server; and a processor coupled to each of the first interface, the second interface, and the third interface and configured to:

receive a service packet from the terminal, wherein the service packet comprises identity information, and wherein the identity information is used to identify whether the service packet can be sent to the application server;

determine whether the service packet can be sent to the application server according to the identity information;

send the service packet to the application server when the service packet can be sent to the application server; or, send the service packet to a core network when the service packet cannot be sent to the application server;

receive a status information subscription request message from the application server, wherein the status information subscription request message is used for requesting status information of a wireless network of the access network side; and send the status information of the wireless network to the application server according to the status information subscription request message.

10. The access network device according to claim 9, wherein the processor is further configured to:

receive a policy modification request message from the application server, wherein the policy modification request message is used for indicating a policy of sending a service packet to the application server; and send a subsequent service packet to the application server according the policy indicated by the policy modification request message.

11. The access network device according to claim 9, wherein the identity information comprises subscriber profile identity (SPID) information, quality of service class identifier (QCI) information, stateful packet inspection (SPI) information, or deep packet inspection (DPI) information.

12. The access network device according to claim 11, wherein the processor is further configured to establish a user plane channel between the access network device and the application server in order to send the service packet through the user plane channel.

13. The access network device according to claim 12, wherein the user plane channel is established according to an application and a wireless network interface protocol, wherein the application and the wireless network interface protocol comprises a control plane protocol and a user plane protocol, wherein the user plane protocol is used for information transmission on the user plane channel, wherein the control plane protocol is used for the establishment of the user plane channel, and wherein the establishment of the user plane channel comprises:

establish, according to the control plane protocol, a control plane link between the access network device and the application server, and establish, according to control information borne by the control plane link, the user plane channel between the access network device and the application server.

14. The access network device according to claim 9, wherein the processor is further configured to send the service packet to a core network when the service packet cannot be sent to the application server.

15. An application server, supporting operation of at least one service, arranged at an access network side, and being independent from an access network device or in the access network device, comprising:

an interface configured to communicate with the access network device;

a memory configured to store service data of a service supported by the application server; and a processor connected to each of the interface and the memory and configured to:

receive, through the interface, a service packet sent by the access network device;

process the service packet;

send a status information subscription request message to the access network device, wherein the status information subscription request message is used for requesting status information of a wireless network of the access network side; and receive the status information of the wireless network from the access network device.

16. The application server according to claim 15, wherein the processor is further configured to:

send a policy modification request message to the access network device, wherein the policy modification request message is used for indicating a policy of sending a service packet to the application server; and receive a subsequent service packet sent by the access network device according to the policy indicated by the policy modification request message.

17. A communication method, applied to an access network side, wherein the access network side comprises an application server and an access network device, wherein the application server is independent from the access network device or in the access network device, wherein the application server supports operation of at least one service, and wherein the method comprises:

receiving, by the access network device, a service packet, wherein the service packet comprises identity information, and wherein the identity information is used to identify whether the service packet can be sent to the application server;

determining, by the access network device according to the identity information, whether the service packet can be sent to the application server;

sending, by the access network device, the service packet to the application server when the service packet can be sent to the application server; or sending, by the access network device, the service packet to a core network when the service packet cannot be sent to the application server;

receiving, by the access network device from the application server, a policy modification request message, wherein the policy modification request message is used for indicating a policy of sending a service packet to the application server; and sending, by the access network device according the policy indicated by the policy modification request message, a subsequent service packet to the application server.

18. A communication method, applied to an access network side, wherein the access network side comprises an application server and an access network device, wherein the application server is independent from the access network device or in the access network device, wherein the application server supports operation of at least one service, and wherein the method comprises:

receiving, by the application server from the access network device, a service packet;

processing, by the application server, the service packet;

sending, by the application server to the access network device, a policy modification request message, wherein the policy modification request message is used for indicating a policy of sending a service packet to the application server; and receiving, by the application server from the access network device, a subsequent service packet sent according to the policy indicated by the policy modification request message.

19. An access network device, located on an access network side, wherein the access network side comprises an application server and the access network device, wherein the application server is independent from the access network device or in the access network device, wherein the application server supports operation of at least one service, and wherein the access network device comprises:

a first interface configured to communicate with a terminal;

a second interface configured to communicate with a core network;

a third interface configured to communicate with the application server; and a processor coupled to each of the first interface, the second interface, and the third interface and configured to:

receive a service packet from the terminal, wherein the service packet comprises identity information, and wherein the identity information is used to identify whether the service packet can be sent to the application server;

determine whether the service packet can be sent to the application server according to the identity information;

send the service packet to the application server when the service packet can be sent to the application server; or, send the service packet to a core network when the service packet cannot be sent to the application server;

receive a policy modification request message from the application server, wherein the policy modification request message is used for indicating a policy of sending a service packet to the application server; and send a subsequent service packet to the application server according the policy indicated by the policy modification request message.

20. An application server, supporting operation of at least one service, arranged at an access network side, and being independent from an access network device or in the access network device, comprising:

an interface configured to communicate with the access network device;

a memory configured to store service data of a service supported by the application server; and a processor connected to each of the interface and the memory and configured to:

receive, through the interface, a service packet sent by the access network device;

process the service packet;

send a policy modification request message to the access network device, wherein the policy modification request message is used for indicating a policy of sending a service packet to the application server; and receive a subsequent service packet sent by the access network device according to the policy indicated by the policy modification request message.

* * * * *